United States Patent
Nakamura et al.

(10) Patent No.: US 12,285,895 B2
(45) Date of Patent: Apr. 29, 2025

(54) INJECTION MOLDING MACHINE MANAGEMENT SYSTEM

(71) Applicant: SEIKO EPSON CORPORATION, Tokyo (JP)

(72) Inventors: Hiroshi Nakamura, Nagano (JP); Keiichi Enomoto, Nagano (JP); Hayato Kobayashi, Higashichikuma-gun Yamagata-mura (JP); Masahiro Hatanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/526,022

(22) Filed: Nov. 15, 2021

(65) Prior Publication Data
US 2022/0152900 A1    May 19, 2022

(30) Foreign Application Priority Data
Nov. 16, 2020 (JP) ................................. 2020-190275

(51) Int. Cl.
*B29C 45/76* (2006.01)
*G06F 9/455* (2018.01)
*B29K 101/12* (2006.01)

(52) U.S. Cl.
CPC .......... *B29C 45/76* (2013.01); *G06F 9/45533* (2013.01); *B29C 2945/76993* (2013.01); *B29K 2101/12* (2013.01)

(58) Field of Classification Search
CPC ........... B29C 45/76; B29C 2945/76993; G06F 9/45533; G06F 30/10; B29K 2101/12
See application file for complete search history.

(56) References Cited

U.S. PATENT DOCUMENTS 4,236,181 A * 11/1980 Shibata ............... G01V 8/20
                                                    250/559.46
7,476,095 B2 * 1/2009 Bader ................. B29C 45/2673
                                                    425/149

(Continued)

FOREIGN PATENT DOCUMENTS

| CN | 102962971 A | 3/2013 |
| CN | 206193470 U | 5/2017 |
| JP | 2014-004828 A | 1/2014 |

*Primary Examiner* — Christopher M Rodd
*Assistant Examiner* — Shibin Liang
(74) *Attorney, Agent, or Firm* — Global IP Counselors, LLP

(57) ABSTRACT

An injection molding machine management system includes an injection molding machine, a first detecting section configured to detect at least one of a physical quantity of the injection molding machine and a physical quantity of a molded article, an on-premise server, and a Cloud server. The Cloud server includes a first storing section configured to store information concerning at least one of the physical quantity of the injection molding machine and the physical quantity of the molded article detected by the first detecting section and a virtual machine configured to generate a control rule for the injection molding machine based on the information. The on-premise server includes a second storing section configured to store the control rule and a control section configured to perform, based on the control rule, control of the injection molding machine corresponding to at least one of the physical quantity of the injection molding machine and the physical quantity of the molded article detected by the first detecting section.

10 Claims, 5 Drawing Sheets

(56) References Cited

U.S. PATENT DOCUMENTS

| | | | |
|---|---|---|---|
| 9,180,617 B2* | 11/2015 | Tsai | B29C 45/766 |
| 2013/0345855 A1 | 12/2013 | Tsai et al. | |
| 2015/0106912 A1* | 4/2015 | Brandon | H04Q 9/00 |
| | | | 726/13 |
| 2017/0095960 A1* | 4/2017 | Chen | B29C 45/766 |
| 2020/0384675 A1* | 12/2020 | Chang | B29C 45/7693 |

* cited by examiner

INJECTION MOLDING MACHINE MANAGEMENT SYSTEM

The present application is based on, and claims priority from JP Application Serial Number 2020-190275, filed Nov. 16, 2020, the disclosure of which is hereby incorporated by reference herein in its entirety.

BACKGROUND

1. Technical Field

The present disclosure relates to an injection molding machine management system.

2. Related Art

There have been used various injection molding machine management systems that manage injection molding machines. For example, JP-A-2014-4828 (Patent Literature 1) discloses a plastic product manufacturing system including a fully-electric injection molding machine, a computer in a machine factory, a computer in a product design factory, and a Cloud server.

However, in the plastic product manufacturing system disclosed in Patent Literature 1, injection conditions of the fully-electric injection molding machine are changed by the computer in the product design factory via the Cloud server. Therefore, it has been difficult to, based on information concerning a molded article and the fully-electric injection molding machine obtained while the molded article is produced, produce the molded article while changing molding conditions for the molded article in real time. This is because it takes time until an instruction to change the molding conditions is sent to the injection molding machine and response speed requested of the injection molding machine cannot be met. In this way, in the injection molding machine management system of related art, it has been difficult to appropriately manage the injection molding machine according to the response speed requested of the injection molding machine.

SUMMARY

An injection molding machine management system according to an aspect of the present disclosure includes: an injection molding machine; a first detecting section configured to detect at least one of a physical quantity of the injection molding machine and a physical quantity of a molded article molded by the injection molding machine; an on-premise server coupled to the injection molding machine and the first detecting section; and a Cloud server coupled to the on-premise server. The Cloud server includes: a first storing section configured to store information concerning at least one of the physical quantity of the injection molding machine and the physical quantity of the molded article detected by the first detecting section; and a virtual machine configured to generate a control rule for the injection molding machine based on the information. The on-premise server includes: a second storing section configured to store the control rule; and a control section configured to perform, based on the control rule, control of the injection molding machine corresponding to at least one of the physical quantity of the injection molding machine and the physical quantity of the molded article detected by the first detecting section.

DESCRIPTION OF EXEMPLARY EMBODIMENTS

Figure 1:
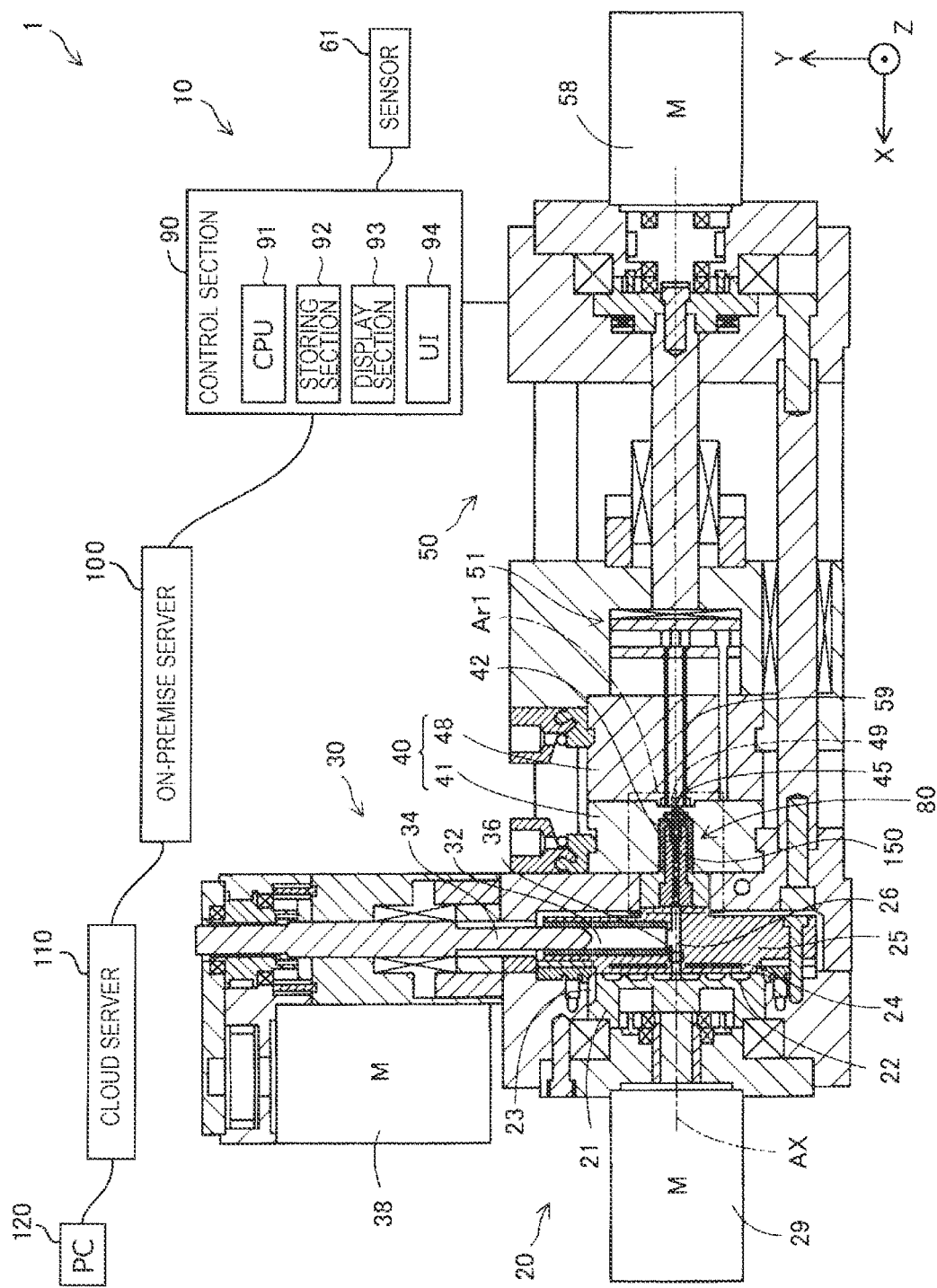
FIG. 1 is a diagram showing a schematic configuration of an injection molding machine management system in a first embodiment of the present disclosure.

First, the present disclosure is schematically explained.

An injection molding machine management system according to a first aspect of the present disclosure includes an injection molding machine, a first detecting section configured to detect at least one of a physical quantity of the injection molding machine and a physical quantity of a molded article molded by the injection molding machine, an on-premise server coupled to the injection molding machine and the first detecting section, and a Cloud server coupled to the on-premise server. The Cloud server includes a first storing section configured to store information concerning at least one of the physical quantity of the injection molding machine and the physical quantity of the molded article detected by the first detecting section and a virtual machine configured to generate a control rule for the injection molding machine based on the information. The on-premise server includes a second storing section configured to store the control rule and a control section configured to perform, based on the control rule, control of the injection molding machine corresponding to at least one of the physical quantity of the injection molding machine and the physical quantity of the molded article detected by the first detecting section.

According to this aspect, the injection molding machine management system includes the on-premise server coupled to the injection molding machine and the first detecting section and the Cloud server coupled to the on-premise server. The Cloud server includes the first storing section configured to store information concerning at least one of the physical quantity of the injection molding machine and the physical quantity of the molded article detected by the first detecting section and the virtual machine configured to generate a control rule for the injection molding machine based on the information. The on-premise server includes the second storing section configured to store the control rule and the control section configured to perform, based on the control rule, control of the injection molding machine corresponding to at least one of the physical quantity of the injection molding machine and the physical quantity of the molded article detected by the first detecting section. That is, it is possible to produce the molded article while changing, based on the control rule generated by the Cloud server based on at least one of the physical quantity of the injection molding machine and the physical quantity of the molded article, in real time, molding conditions for the molded article with the on-premise server coupled to the injection molding machine. Since production control for the molded article can be performed by the on-premise server coupled to the injection molding machine, it is possible to appropriately manage the injection molding machine according to response speed requested of the injection molding machine.

According to a second aspect of the present disclosure, in the injection molding machine management system according to the first aspect, a detection result of the first detecting section may be sent to the Cloud server via the on-premise server.

According to this aspect, the detection result of the first detecting section is sent to the Cloud server via the on-premise server. Therefore, it is possible to cause the on-premise server as well to store, according to necessity, the detection result of the first detecting section sent to the Cloud server.

According to a third aspect of the present disclosure, the injection molding machine management system according to the first or second aspect may include a second detecting section configured to detect a setting environment of the injection molding machine, and a detection result of the second detecting section may be sent to the Cloud server not via the on-premise server.

According to this aspect, since the injection molding machine management system includes the second detecting section configured to detect the setting environment of the injection molding machine, it is possible to manage the injection molding machine considering the setting environment of the injection molding machine. Since the detection result of the second detecting section is sent to the Cloud server not via the on-premise server, the Cloud server can quickly input the detection result of the second detecting section. It is possible to quickly generate a control rule considering the detection result.

According to a fourth aspect of the present disclosure, in the injection molding machine management system according to the third aspect, the second detecting section may detect, as the setting environment, at least one of air pressure, temperature, humidity, illuminance, and an amount of floating impurity particles.

According to this aspect, it is possible to manage the injection molding machine considering at least any one of the air pressure, the temperature, the humidity, the illuminance, and the amount of floating impurity particles.

According to a fifth aspect of the present disclosure, in the injection molding machine management system according to any one of the first to fourth aspects, the first detecting section may be provided in the injection molding machine.

According to this aspect, the first detecting section is provided in the injection molding machine. Therefore, since it is unnecessary to separately prepare a detection device including the first detecting section, it is possible to simplify the configuration of the injection molding machine management system.

According to a sixth aspect of the present disclosure, the injection molding machine management system according to anyone of the first to fourth aspects may include, as the first detecting section, a molded-article detecting section separate from the injection molding machine and capable of detecting the physical quantity of the molded article.

According to this aspect, the injection molding machine management system includes, as the first detecting section, the molded-article detecting section separate from the injection molding machine and capable of detecting the physical quantity of the molded article. Therefore, since it is unnecessary to provide the molded-article detecting section functioning as the first detecting section in the injection molding machine, it is possible to simplify the configuration of the injection molding machine.

According to a seventh aspect of the present disclosure, the injection molding machine management system according to the sixth aspect may include, as the first detecting section, a molding-machine detecting section provided in the injection molding machine and capable of detecting the physical quantity of the injection molding machine.

According to this aspect, the injection molding machine management system includes the molded-article detecting section separate from the injection molding machine and capable of detecting the physical quantity of the molded article and includes, in the injection molding machine, the molding-machine detecting section capable of detecting the physical quantity of the injection molding machine. Therefore, it is possible to detect not only the physical quantity of the molded article but also the physical quantity of the injection molding machine. It is possible to particularly appropriately manage the injection molding machine.

According to an eighth aspect of the present disclosure, in the injection molding machine management system according to any one of the first to seventh aspects, the physical quantity of the injection molding machine detected by the first detecting section may be at least one of temperature, pressure, torque, and vibration in the injection molding machine.

According to this aspect, the physical quantity of the injection molding machine detected by the first detecting section is at least one of the temperature, the pressure, the torque, and the vibration in the injection molding machine. Therefore, it is possible to appropriately manage the injection molding machine based on at least one of the temperature, the pressure, the torque, and the vibration in the injection molding machine.

According to a ninth aspect of the present disclosure, in the injection molding machine management system according to any one of the first to eighth aspects, the physical quantity of the molded article detected by the first detecting section may be at least any one of a dimension, luminance, and temperature of the molded article.

According to this aspect, the physical quantity of the molded article detected by the first detecting section is at least any one of the dimension, the luminance, and the temperature of the molded article. Therefore, it is possible to appropriately manage the injection molding machine based on at least one of the dimension, the luminance, and the temperature of the molded article.

First Embodiment

Embodiments of the present disclosure are explained below with reference to the accompanying drawings. First, a schematic configuration of an injection molding machine management system 1A in a first embodiment among injection molding machine management systems 1 of the present disclosure is explained with reference to FIG. 1. The injection molding machine management system 1A in this modification includes an injection molding machine 10 electrically coupled to a control section 90, an on-premise server 100 electrically coupled to the control section 90 and capable of performing transmission and reception of data to and from the control section 90, a Cloud server 110 electrically coupled to the on-premise server 100 and capable of performing transmission and reception of data to and from the on-premise server 100, and a PC 120 that is a computer to which an operator can input various data and is electrically coupled to the Cloud server 110 and performs transmission and reception of data to and from the Cloud server 110. Although one on-premise server 100 and one injection molding machine 10 are shown in FIG. 1, the on-premise server 100 is coupled to a plurality of injection molding machines 10 via a plurality of control sections 90. However, the on-premise server 100 may be coupled to one injection molding machine 10.

In FIG. 1, a cross section of the injection molding machine 10 taken along the vertical direction in a cross section including an axis AX of a channel 150 formed in a hot runner 80 is schematically shown. In FIG. 1, an X axis, a Y axis, and a Z axis orthogonal to one another are shown. A +Z direction is equivalent to the vertical upward direction. The axis AX is parallel to the X axis. The X axis, the Y axis, and the Z axis shown in FIG. 1 respectively correspond to X axes, Y axes, and Z axes shown in the other figures. The injection molding machine 10 injects a material such as thermoplastic resin into a die and molds a molded article. The injection molding machine 10 includes a material generating section 20, an injecting section 30, a die for injection molding 40, and a die opening and closing section 50. The control section 90 may be configured integrally with the injection molding machine 10 or may be configured separately from the injection molding machine 10 and electrically coupled to the injection molding machine 10 as in this embodiment.

The material generating section 20 plasticizes or melts at least a part of a solid material supplied from a not-shown hopper disposed vertically above to thereby generate a material having fluidity and supplies the material to the injecting section 30 side. Such a solid material is poured into the hopper in various granular forms such as pellet and powder. The material generating section 20 includes a flat screw 21, a barrel 25, and a driving motor 29.

The flat screw 21 has a substantially columnar exterior shape, the length of which along the axis AX is smaller than the diameter thereof. The flat screw 21 is disposed such that the axis AX of the channel 150 formed in the hot runner 80 and the axis AX of the flat screw 21 coincide. A groove 22 is formed on the end face of the flat screw 21 on the side opposed to the barrel 25. A material inflow port 23 is formed on the outer circumferential surface of the flat screw 21. The groove 22 continues to the material inflow port 23. The material inflow port 23 receives the solid material supplied from the hopper.

The center of the flat screw 21 is configured as a recess, to which one end of the groove 22 is coupled, and is opposed to a communication hole 26 of the barrel 25. The groove 22 of the flat screw 21 is configured by a so-called scroll groove and is formed in a swirl shape to draw an arc from the center where the axis AX is located toward the outer circumferential surface side of the flat screw 21. The groove 22 may be spirally formed.

The barrel 25 has a substantially disk-like exterior shape and is disposed to be opposed to the flat screw 21. A heater 24 functioning as a heating section for heating a material is embedded in the barrel 25. The communication hole 26 piercing through the barrel 25 along the axis AX is formed in the barrel 25. The communication hole 26 functions as a channel for leading the material to the hot runner 80. An injection cylinder 32 piercing through the barrel 25 along an axis orthogonal to the axis AX is formed. The injection cylinder 32 configures a part of the injecting section 30 and communicates with the communication hole 26.

The driving motor 29 is coupled to the end face of the flat screw 21 on the opposite side of the side opposed to the barrel 25. The driving motor 29 is driven according to a command from the control section 90 and rotates the flat screw 21 with the axis AX as a rotation axis.

At least a part of the material supplied from the material inflow port 23 is plasticized or melted by rotation of the flat screw 21 and conveyed with improved fluidity while being heated by a heating member of the barrel 25 in the groove 22 of the flat screw 21 and is led to the communication hole 26. Compression and degassing of the material are also realized by the rotation of the flat screw 21. "Plasticized" means that a material having thermoplasticity is softened by being heated to temperature equal to or higher than the glass transition point and exhibits fluidity. "Melted" not only means that the material having thermoplasticity is heated to temperature equal to or higher than the melting point and liquidized but also means that the material having thermoplasticity is plasticized.

The injecting section 30 measures the material supplied from the material generating section 20 and injects the material into a cavity 49 formed in a movable die 48 of the die for injection molding 40. The injecting section 30 includes the injection cylinder 32, an injection plunger 34, a check valve 36, an injection motor 38, and the hot runner 80.

The injection cylinder 32 is formed in a substantially cylindrical shape on the inside of the barrel 25 and communicates with the communication hole 26. The injection plunger 34 is slidably disposed in the injection cylinder 32. The injection plunger 34 slides in a +Y direction, whereby the material in the communication hole 26 is drawn into the injection cylinder 32 and measured. The injection plunger 34 slides in a −Y direction, whereby the material in the injection cylinder 32 is pressure-fed to the hot runner 80 side and injected into the cavity 49. The check valve 36 is disposed in the communication hole 26 further on the flat screw 21 side than a communication part of the injection cylinder 32 and the communication hole 26. The check valve 36 allows flow of the material from the flat screw 21 side to the hot runner 80 side and suppresses backflow of the material from the hot runner 80 side to the flat screw 21 side. When the injection plunger 34 slides vertically downward, a spherical valve body included in the check valve 36 moves to the flat screw 21 side, whereby the communication hole 26 is closed. The injection motor 38 is driven according to a command from the control section 90 and causes the injection plunger 34 to slide in the injection cylinder 32. Sliding speed and a sliding amount of the injection plunger 34 are set in advance according to a type of the material, the size of the cavity 49, and the like. The hot runner 80 has a function of leading the material to the cavity 49 in a heated state.

The die for injection molding 40 includes a fixed die 41 and a movable die 48. A hot runner attachment hole 42 piercing through the fixed die 41 along the axis AX is formed on the inside of the fixed die 41. The hot runner 80 is disposed in the hot runner attachment hole 42.

The hot runner attachment hole 42 is formed with the inner diameter thereof decreasing stepwise in order from the material generating section 20 side. The end portion of the hot runner attachment hole 42 on the opposite side of the material generating section 20 side is formed in a substantially conical shape, the inner diameter of which gradually decreases. The distal end side of the end portion functions as a gate opening 45 into which a shaping material flows. The gate opening 45 is configured as a substantially circular hole.

The movable die 48 is disposed to be opposed to the fixed die 41. The movable die 48 is brought into contact with the fixed die 41 at the time of die closing and die clamping including an injection time and a cooling time of the shaping material and is separated from the fixed die 41 at the time of die opening including a release time of a molded article. The fixed die 41 and the movable die 48 come into contact, whereby the cavity 49 communicating with the gate opening 45 is formed between the fixed die 41 and the movable die 48. The cavity 49 is designed in advance in a shape of a molded article molded by injection molding. In this embodiment, the cavity 49 is formed to directly extend to the gate opening 45 but may be formed to extend to the gate opening 45 further via a runner.

The die opening and closing section 50 shown in FIG. 1 performs opening and closing of the fixed die 41 and the movable die 48. The die opening and closing section 50 includes a die opening and closing motor 58, a movable-die moving section 51, and a push-out pin 59. The die opening and closing motor 58 is driven according to a command from the control section 90 and moves the movable die 48 along the axis AX. Consequently, die closing, die clamping, and die opening of the die for injection molding 40 are realized. The push-out pin 59 is disposed in a position communicating with the cavity 49. The push-out pin 59 pushes out a molded article at the time of the die opening to thereby release the molded article.

The control section 90 controls the operation of the entire injection molding machine 10 to execute injection molding. The control section 90 is configured by a computer including a CPU 91, a storing section 92, a display section 93, and a UI 94, which is a user interface. The CPU 91 has a function of executing a control program and the like stored in advance in the storing section 92. The display section 93 and the UI 94 can also be configured as a touch panel. However, the display section 93 may be configured as a monitor and the UI 94 may be configured as a keyboard, a mouse, or the like. As the storing section 92, at least one of a ROM, a hard disk, an EEPRAM, a RAM, or the like can be used.

The control section 90 is coupled to, via a not-shown interface, a sensor 61 functioning as a first detecting section that detects a physical quantity of the injection molding machine 10 and is coupled to the on-premise server 100. The control section 90 can perform transmission and reception of data such as a detection result of the sensor 61 to and from the on-premise server 100. The on-premise server 100 is set in a factory where the injection molding machine 10 is set. The on-premise server 100 is electrically coupled to the Cloud server 110 set in a different site. The on-premise server 100 can perform transmission and reception of data such as a detection result of the sensor 61 to and from the Cloud server 110. The Cloud server 110 is electrically coupled to the PC 120 capable of receiving various instructions and the like by an operator. A setting place of the PC 120 is not particularly limited. However, the PC 120 may be set in, for example, a factory where the on-premise server 100 and the injection molding machine 10 are set. In the injection molding machine management system 1A in this embodiment, the control section 90 and the sensor 61 can be regarded as being coupled to the injection molding machine 10 and the control section 90 and the sensor 61 can also be regarded as being provided in the injection molding machine 10.

Figure 2:
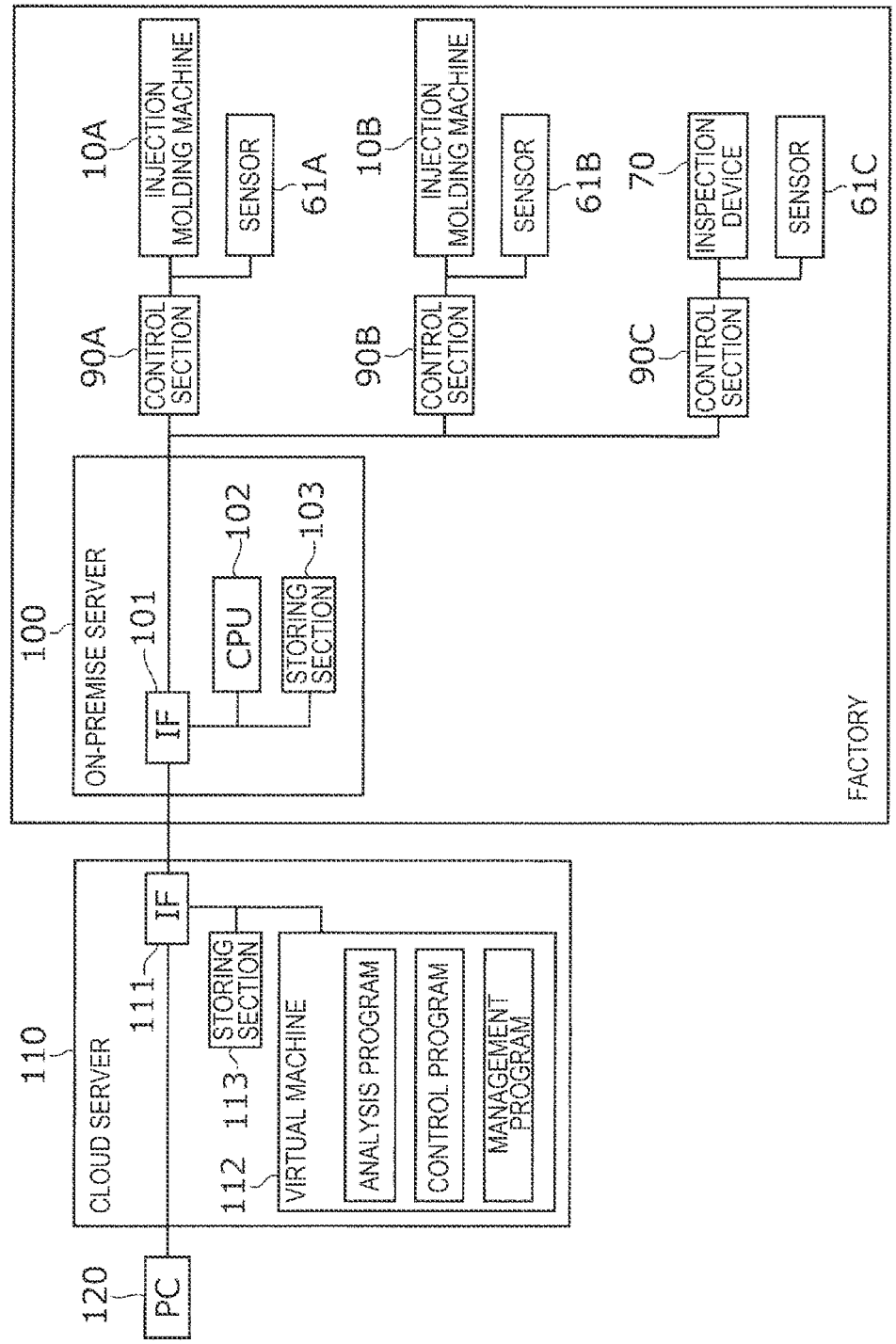
FIG. 2 is a block diagram showing an electrical configuration of the injection molding machine management system in the first embodiment.
Figure 5:
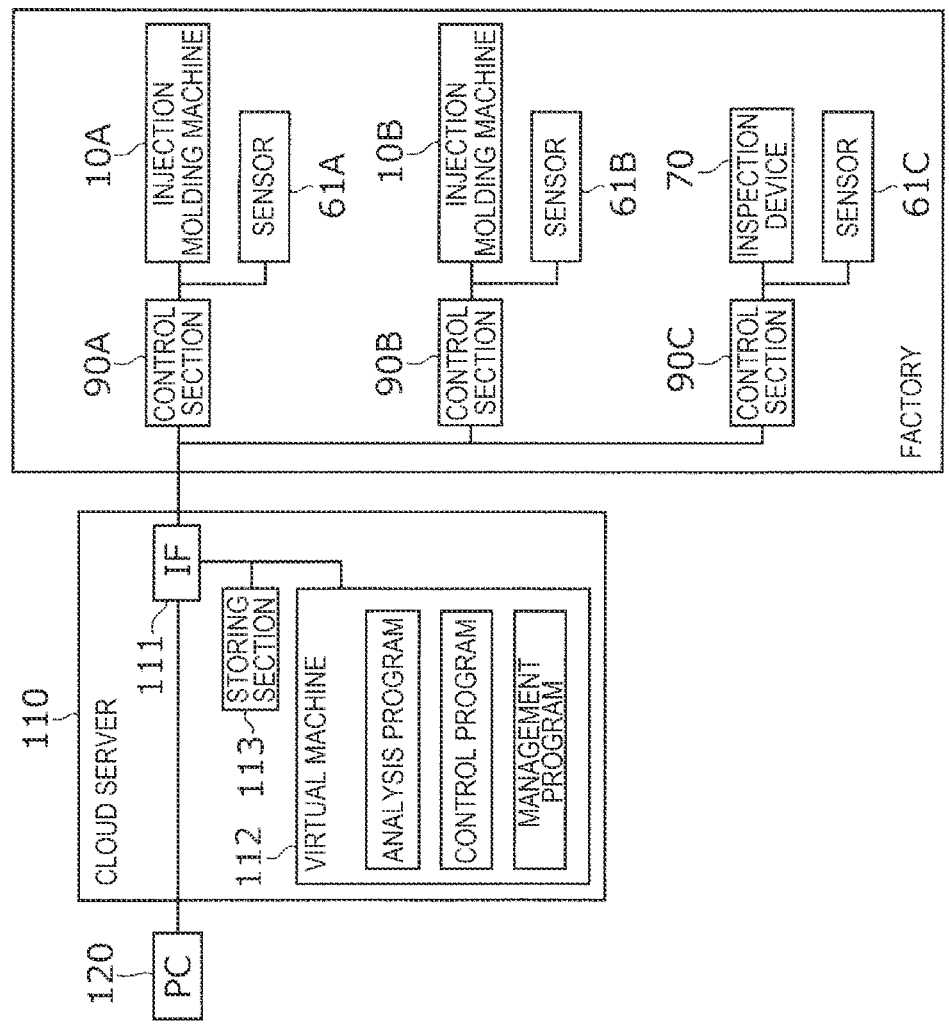
FIG. 5 is a block diagram showing an electrical configuration of an injection molding machine management system in a reference example.

An electrical configuration of the injection molding machine management system 1A in this embodiment is explained with reference to FIG. 2 showing the injection molding machine management system 1A in this embodiment and with reference to FIG. 5 showing an injection molding machine management system 11 in a reference example. As shown in FIG. 2, in the injection molding machine management system 1A in this embodiment, an injection molding machine 10A among the plurality of injection molding machines 10 and a sensor 61A that detects a physical quantity of the injection molding machine 10A are coupled to a control section 90A. An injection molding machine 10B among the plurality of injection molding machines 10 and a sensor 61B that detects a physical quantity of the injection molding machine 10B are coupled to a control section 90B. Further, although not shown in FIG. 1, an inspection device 70 that inspects molded articles molded by the injection molding machine 10A and the injection molding machine 10B and a sensor 61C that detects physical quantities of the molded articles are coupled to a control section 90C. All of the sensors 61, specifically, the sensor 61A, the sensor 61B, and the sensor 61C configure a first detecting section that detects at least one of a physical quantity of the injection molding machine 10 and a physical quantity of a molded article.

The control section 90A, the control section 90B, and the control section 90C are coupled to the on-premise server 100 via an IF 101, which is an interface provided in the on-premise server 100. The on-premise server 100 includes a storing section 103 including a hard disk and a ROM in which various data and programs are stored and a RAM capable of temporarily storing data and a CPU 102 that executes a control program and the like based on the data and the like stored in the storing section 103. All of the plurality of injection molding machines 10 including the sensors 61 functioning as a plurality of first detecting sections and the control sections 90, the inspection device 70, and the on-premise server 100 are provided in a site of the same factory.

The on-premise server 100 is coupled to the Cloud server 110 via an IF 111, which is an interface provided in the Cloud server 110. The Cloud server 110 includes a storing section 113 including a hard disk and a ROM in which various data and programs are stored and a RAM capable of temporarily storing data and the like and a virtual machine 112 that executes an analysis program, a control program, a management program, and the like stored in the storing section 113. The virtual machine 112 can be configured by a CPU or the like. The Cloud server 110 is coupled to the PC 120 via the IF 111. The Cloud server 110 is provided in a place different from the factory where the on-premise server 100 is provided. However, the Cloud server 110 may be provided in the factory where the on-premise server 100 is provided. The PC 120 may be provided in the factory where the on-premise server 100 is provided but may be provided in another place.

Since the injection molding machine management system 1A in this embodiment is configured as explained above, data of physical quantities of the injection molding machines 10 and physical quantities of molded articles detected by the respective sensors 61 can be input to the Cloud server 110 via the on-premise server 100. The virtual machine 112 in the Cloud server 110 can generate a control rule for determining, based on these data, how to control the respective injection molding machines 10. By inputting the control rule to the on-premise server 100 from the Cloud server 110 and causing the storing section 103 to store the control rule, the on-premise server 100 can control driving of the respective injection molding machines 10 based on the control rule.

On the other hand, the injection molding machine management system 11 in the reference example having the same configuration as the configuration of the injection molding machine management system 1A in this embodiment except that the on-premise server 100 is not included as shown in FIG. 5 is explained. The injection molding machine management system 11 in the reference example not including the on-premise server 100 shown in FIG. 5 corresponds to a general injection molding machine management system in the past. Since the injection molding machine management system 11 in the reference example does not include the on-premise server 100, driving control for the injection molding machine 10 based on the control rule generated by the Cloud server 110 needs to be performed in the Cloud server 110. However, if the driving control for the injection molding machine 10 is performed in the Cloud server 110, even if it is attempted to perform production of a molded article while changing molding conditions for the molded article in real time, an input time for data of a physical quantity of the injection molding machine 10 and a physical quantity of the molded article that should be input in real time and a time until an instruction to change the molding conditions is sent to the injection molding machine 10 are long. Therefore, response speed requested of the injection molding machine 10 cannot be met.

As explained above, the injection molding machine management system 1A in this embodiment includes the injection molding machine 10, the sensor 61 that detects at least one of a physical quantity of the injection molding machine 10 and a physical quantity of a molded article molded by the injection molding machine 10, the on-premise server 100 coupled to the injection molding machine 10 and the sensor 61, and the Cloud server 110 coupled to the on-premise server 100. The Cloud server 110 includes the storing section 113 functioning as the first storing section that stores information concerning at least one of the physical quantity of the injection molding machine 10 and the physical quantity of the molded article detected by the sensor 61 and the virtual machine 112 that generates a control rule for the injection molding machine 10 based on the information. The on-premise server 100 includes the storing section 103 functioning as the second storing section that stores the control rule generated by the virtual machine 112 and the CPU 102 functioning as the control section that performs, based on the control rule, control of the injection molding machine 10 corresponding to at least one of the physical quantity of the injection molding machine 10 and the physical quantity of the molded article detected by the sensor 61.

Since the injection molding machine management system 1A in this embodiment is configured as explained above, it is possible to produce the molded article while changing, based on the control rule generated by the Cloud server 110 based on at least one of the physical quantity of the injection molding machine 10 and the physical quantity of the molded article, in real time, molding conditions for the molded article with the on-premise server 100 coupled to the injection molding machine 10. Since production control for the molded article can be performed by the on-premise server 100 coupled to the injection molding machine 10, the injection molding machine management system 1A in this embodiment can appropriately manage the injection molding machine 10 according to the response speed requested of the injection molding machine 10.

If a data amount such as the physical quantity of the injection molding machine 10 and the physical quantity of the molded article stored in the on-premise server 100 increases, processing speed of the on-premise server 100 sometimes decreases. However, by adopting the configuration in this embodiment, it is possible to prevent the data amount stored in the on-premise server 100 from excessively increasing. By preventing the data amount stored in the on-premise server 100 from excessively increasing, it is possible to suppress the processing speed of the on-premise server 100 from decreasing and reduce a load applied to maintenance of the on-premise server 100. By reducing the load applied to the maintenance of the on-premise server 100, it is possible to reduce cost for the injection molding machine management system 1A.

In the injection molding machine management system 1A in this embodiment, a detection result of the sensor 61 is sent to the Cloud server 110 via the on-premise server 100. Since the injection molding machine management system 1A in this embodiment is configured as explained above, it is possible to cause not only the Cloud server 110 but also the on-premise server 100 to store, according to necessity, the detection result of the sensor 61 sent to the Cloud server 110. By causing not only the Cloud server 110 but also the on-premise server 100 to store, according to necessity, the detection result of the sensor 61, it is sometimes possible to make it unnecessary to input the detection result from the Cloud server 110 again when the detection result is necessary and particularly quickly perform processing using the detection result in the on-premise server 100. Since it is possible to collectively transmit the physical quantity of the injection molding machine 10 and the physical quantity of the molded article from the on-premise server 100 to the Cloud server 110, it is also possible to reduce the number of times of transmission.

A physical quantity of the injection molding machine 10 detected by the sensor 61A and the sensor 61B functioning as the sensor 61 can be, for example, at least one of temperature, pressure, torque, and vibration in the injection molding machine 10. When the physical quantity of the injection molding machine 10 detected by the sensor 61 is at least one of the temperature, the pressure, the torque, and the vibration in the injection molding machine 10, it is possible to appropriately manage the injection molding machine 10 based on at least one of the temperature, the pressure, the torque, and the vibration in the injection molding machine 10.

A physical quantity of the molded article detected by the sensor 61C functioning as the sensor 61 can be at least one of a dimension, luminance, and temperature of the molded article. When the physical quantity of the molded article detected by the sensor 61 is at least one of the dimension, the luminance, and the temperature of the molded article, it is possible to appropriately manage the injection molding machine 10 based on at least one of the dimension, the luminance, and the temperature of the molded article.

The sensor 61C functioning as the sensor 61 plays a role of a molded-article detecting section provided in the inspection device 70 separate from the injection molding machine 10 and capable of detecting a physical quantity of the molded article. The injection molding machine management system 1A in this embodiment is configured as explained above to make it unnecessary to provide the sensor 61 functioning as the molded-article detecting section in the injection molding machine 10 and simplify the configuration of the injection molding machine 10.

On the other hand, the sensor 61A and the sensor 61B functioning as the sensor 61 play a role of a molding-machine detecting section provided in the injection molding machine 10 and capable of detecting a physical quantity of the injection molding machine 10. Since the injection molding machine management system 1A in this embodiment is configured as explained above, it is possible to detect not only the physical quantity of the molded article but also the physical quantity of the injection molding machine 10. It is possible to particularly appropriately manage the injection molding machine 10.

Second Embodiment

Figure 3:
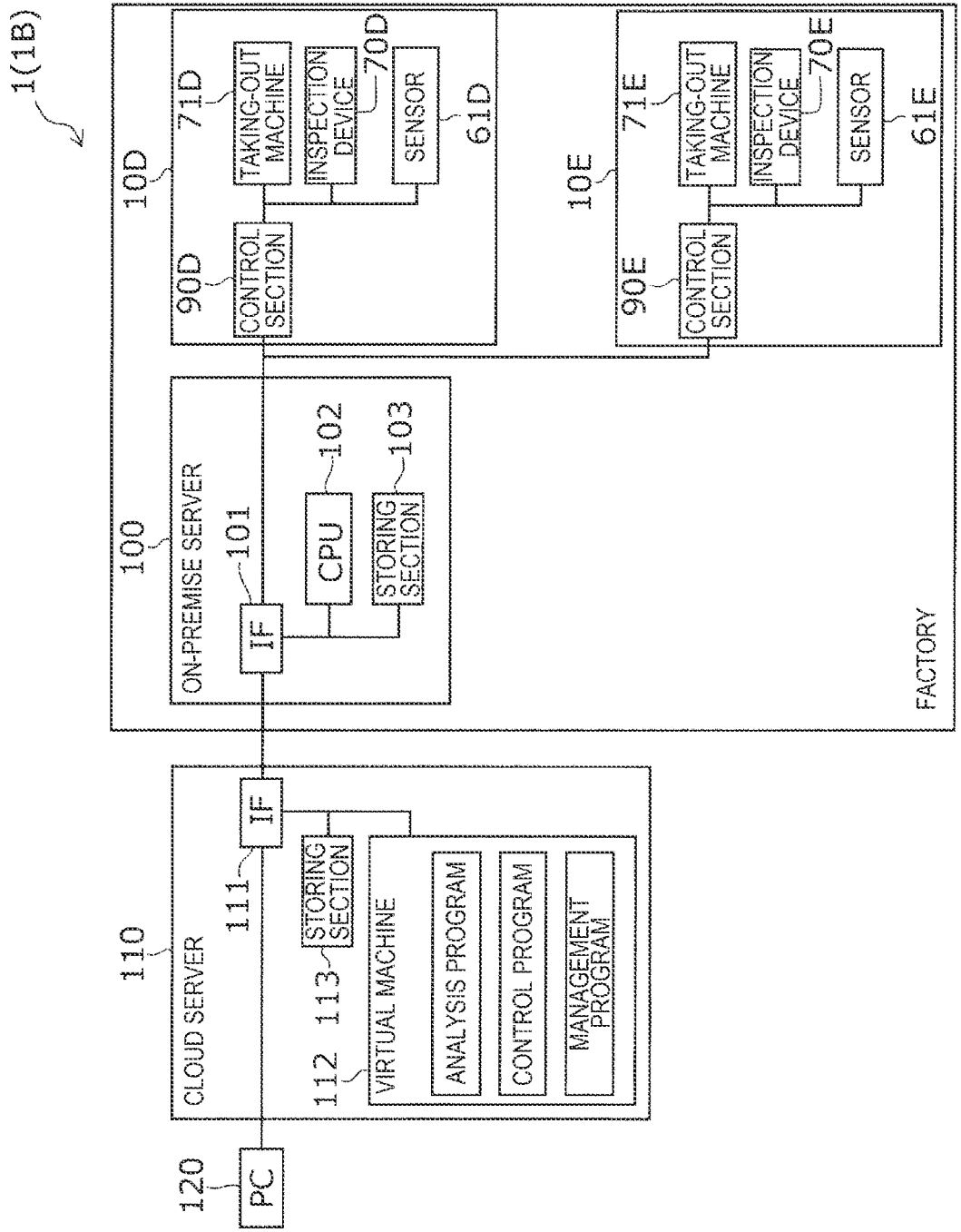
FIG. 3 is a block diagram showing an electrical configuration of an injection molding machine management system in a second embodiment.

An injection molding machine management system 1B in a second embodiment is explained below with reference to FIG. 3. FIG. 3 is a diagram corresponding to FIG. 2 in the injection molding machine management system 1A in the first embodiment. The injection molding machine management system 1B in this embodiment has the same configuration as the configuration of the injection molding machine management system 1A except portions explained below and has the same characteristics as the characteristics of the injection molding machine management system 1A in the first embodiment. Constituent members common to the first embodiment in FIG. 3 are denoted by the same reference numerals and signs and detailed explanation about the constituent members is omitted.

As shown in FIG. 2, in the injection molding machine management system 1A in the first embodiment, the inspection device 70 is provided separately from the injection molding machine 10. The sensor 61C functioning as the first detecting section is provided in the inspection device 70 as well. On the other hand, as shown in FIG. 3, in the injection molding machine management system 1B in this embodiment, the inspection device 70 functioning as a detection device including the sensor 61 functioning as the first detecting section is provided in the injection molding machine 10. The sensor 61 provided in the injection molding machine 10 plays a function of a molded-article detecting section and a role of a molding-machine detecting section.

If the above is explained from another viewpoint, by providing the sensor 61 functioning as the first detecting section in the injection molding machine 10, it is possible to make it unnecessary to separately prepare the detection device including the first detecting section. Therefore, it is possible to simplify the configuration of the injection molding machine management system 1.

As shown in FIG. 3, the injection molding machine management system 1B in this embodiment includes two injection molding machines 10D and 10E as the injection molding machines 10. However, the number of the injection molding machines 10 is not particularly limited. The injection molding machine 10D includes, besides an inspection device 70D and a sensor 61D, a taking-out machine 71D capable of taking out a molded article from the injection molding machine 10D. The injection molding machine 10E includes, besides an inspection device 70E and a sensor 61E, a taking-out machine 71E capable of taking out a molded article from the injection molding machine 10E. However, the injection molding machine 10E is not particularly limited to such a configuration. For example, the injection molding machine 10E may not include the taking-out machine 71E or may further include another device in addition to the taking-out machine 71E.

Third Embodiment

Figure 4:
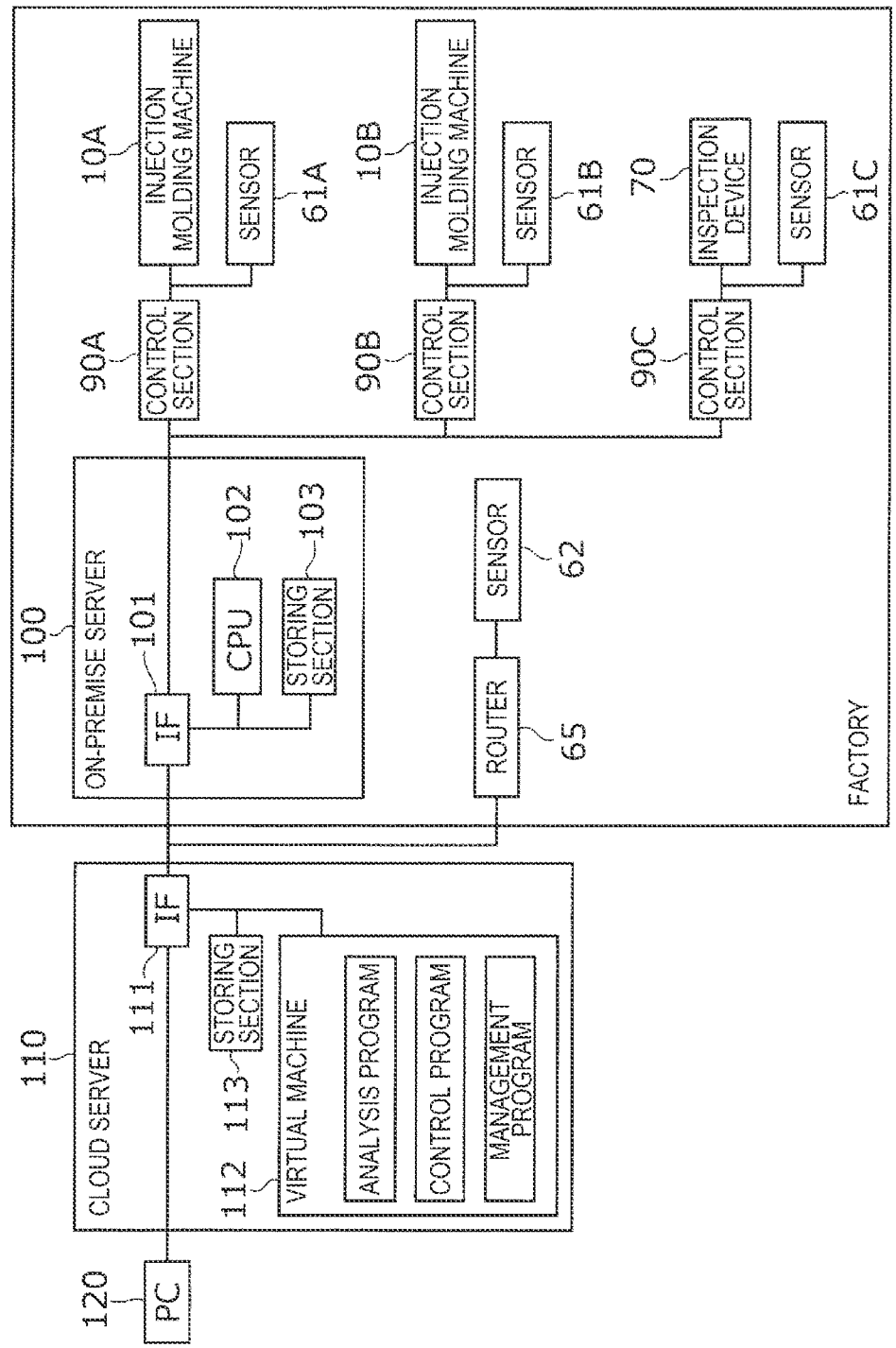
FIG. 4 is a block diagram showing an electrical configuration of an injection molding machine management system in a third embodiment.

An injection molding machine management system 1C in a third embodiment is explained with reference to FIG. 4. FIG. 4 is a diagram corresponding to FIG. 2 in the injection molding machine management system 1A in the first embodiment. The injection molding machine management system 1C in this embodiment has the same configuration as the configuration of the injection molding machine management system 1A in the first embodiment except portions explained below and has the same characteristics as the characteristics of the injection molding machine management system 1A in the first embodiment. In FIG. 4, constituent members common to the first embodiment are denoted by the same reference numerals and signs. Detailed explanation about the constituent members is omitted.

As it is seen when FIG. 2 and FIG. 4 are compared, the injection molding machine management system 1C in this embodiment is different from the injection molding machine management system 1A in the first embodiment only in that the injection molding machine management system 1C includes a sensor 62 functioning as a second detecting section that detects environment data in a factory, which is a setting environment of the injection molding machine 10, and a router 65 capable of transmitting a detection result of the sensor 62 to the Cloud server 110. Since the injection molding machine management system 1C in this embodiment is configured as explained above, the detection result of the sensor 62 is sent to the Cloud server 110 not via the on-premise server 100.

The injection molding machine management system 1C in this embodiment includes the sensor 62 that detects the setting environment of the injection molding machine 10. Therefore, the injection molding machine management system 1C can manage the injection molding machine 10 considering the setting environment of the injection molding machine 10. In the injection molding machine management system 1C in this embodiment, the detection result of the sensor 62 is sent to the Cloud server 110 not via the on-premise server 100. Therefore, the Cloud server 110 can quickly input the detection result and quickly generate a control rule considering the detection result.

The sensor 62 can detect, as the setting environment, for example, at least one of air pressure, temperature, humidity, illuminance, and an amount of floating impurity particles. Therefore, the injection molding machine management system 1C in this embodiment can manage the injection molding machine 10 considering at least one of the air pressure, the temperature, the humidity, the illuminance, and the amount of floating impurity particles in the factory.

The present disclosure is not limited to the embodiments explained above and can be realized in various configurations without departing from the gist of the present disclosure. For example, in the embodiments, the injection molding machine management systems for the purpose of managing the injection molding machine 10 is explained. However, the present disclosure can also be applied to a system for the purpose of managing a device other than the injection molding machine. Technical features in the embodiments corresponding to technical features in the aspects described in the summary can be substituted or combined as appropriate in order to solve a part or all of the problems described above or achieve a part or all of the effects described above. Unless the technical features are not explained in this specification as essential technical features, the technical features can be deleted as appropriate.

What is claimed is:
1. An injection molding machine management system comprising:
    an injection molding machine;
    an electronic controller electrically connected to the injection molding machine;
    a first detecting section connected to the electronic controller and configured to detect a physical quantity that includes at least a physical quantity of a molded article that has been molded by the injection molding machine;

an on-premise server electrically connected to the electronic controller, and configured to perform transmission and reception of digital data to and from the electronic controller, the on-premise server including an on-premise interface provided in the on-premise server;

a Cloud server including a Cloud server interface provided in the Cloud server, the Cloud server being electrically connected to the on-premise server via the on-premise server interface and the Cloud server interface and configured to perform transmission and reception of digital data to and from the on-premise server via the on-premise server interface and the Cloud server interface, the Cloud server being electrically connected to the first detecting section via the on-premise server and the electronic controller such that the Cloud server and the first detecting section communicate with each other and such that the Cloud server receives the digital data including the physical quantity from the first detecting section via the Cloud server interface, the on-premise server interface, and the electronic controller, the Cloud server further including a first storing section configured to store information concerning the physical quantity, and a virtual machine configured to execute programs stored in the first storing section;

a sensor configured to detect a setting environment of the injection molding machine; and a router electrically connected to the Cloud server and the sensor such that a detection result of the sensor is transmitted from the sensor to the Cloud server via the router and the Cloud server interface without via the on-premise server and the on-premise server interface, and the on-premise server including a control section including a processor configured to receive from the Cloud server the digital data including a control rule for the injection molding machine based on the information, and perform, based on the control rule, control of the injection molding machine corresponding to the physical quantity, and a second storing section configured to store the control rule.

2. The injection molding machine management system according to claim 1, wherein the sensor detects, as the setting environment, at least one of air pressure, temperature, humidity, illuminance, and an amount of floating impurity particles.

3. The injection molding machine management system according to claim 1, wherein the first detecting section is provided in the injection molding machine.

4. The injection molding machine management system according to claim 1, wherein the injection molding machine management system includes, as the first detecting section, a molded-article detecting section separate from the injection molding machine and configured to detect the physical quantity of the molded article.

5. The injection molding machine management system according to claim 1, wherein the physical quantity of the molded article includes a dimension of the molded article.

6. The injection molding machine management system according to claim 1, wherein the physical quantity of the molded article includes the temperature of the molded article.

7. The injection molding machine management system according to claim 1, wherein the physical quantity of the molded article includes at least one of luminance and temperature of the molded article.

8. The injection molding machine management system according to claim 1, wherein the physical quantity further includes a physical quantity of the injection molding machine.

9. The injection molding machine management system according to claim 8, wherein the injection molding machine management system includes, as the first detecting section, a molding-machine detecting section provided in the injection molding machine and configured to detect the physical quantity of the injection molding machine.

10. The injection molding machine management system according to claim 8, wherein the physical quantity of the injection molding machine is at least one of temperature, pressure, torque, and vibration in the injection molding machine.

* * * * *